United States Patent
Canteleux

(10) Patent No.: US 7,300,108 B2
(45) Date of Patent: Nov. 27, 2007

(54) AUTOMOBILE SEAT WITH ADJUSTABLE-HEIGHT SEAT PAN HAVING A SEAT BELT ATTACHMENT POINT

(75) Inventor: Joël Canteleux, Bailleau-Armenonville (FR)

(73) Assignee: Faurecia Sieges d'Automobile, Nanterre (FR)

( * ) Notice: Subject to any disclaimer, the term of this patent is extended or adjusted under 35 U.S.C. 154(b) by 175 days.

(21) Appl. No.: 11/216,673

(22) Filed: Aug. 31, 2005

(65) Prior Publication Data

US 2006/0055227 A1    Mar. 16, 2006

(30) Foreign Application Priority Data

Sep. 10, 2004  (FR) ................................ 04 09598

(51) Int. Cl.
*B60N 2/427* (2006.01)
*B60N 21/00* (2006.01)

(52) U.S. Cl. ............................... 297/344.15; 297/216.1

(58) Field of Classification Search .......... 297/344.15, 297/216.1, 216.16, 216.17, 216.18
See application file for complete search history.

(56) References Cited

U.S. PATENT DOCUMENTS

| | | | |
|---|---|---|---|
| 4,461,511 A * | 7/1984 | Berneking et al. .. | 297/345.15 X |
| 4,482,188 A | 11/1984 | Tilly et al. | |
| 5,908,219 A * | 6/1999 | Bohmler ................... | 297/216.1 |
| 6,048,034 A * | 4/2000 | Aumont et al. ....... | 297/216.1 X |
| 6,050,635 A * | 4/2000 | Pajon et al. ............. | 297/216.1 |
| 6,076,887 A * | 6/2000 | Andersson ............... | 297/216.1 |
| 6,116,689 A | 9/2000 | Bauer et al. | |
| 6,402,218 B1 * | 6/2002 | Kamei et al. ............ | 297/216.1 |
| 6,659,548 B2 * | 12/2003 | Becker et al. ........... | 297/216.1 |
| 6,805,408 B2 * | 10/2004 | Buhl et al. .............. | 297/344.15 |
| 6,902,234 B2 * | 6/2005 | Becker et al. ........... | 297/216.1 |
| 6,974,187 B2 * | 12/2005 | Minai ....................... | 297/216.1 |

FOREIGN PATENT DOCUMENTS

| | | |
|---|---|---|
| DE | 32 41 836 A1 | 5/1984 |
| DE | 85 34 017 U1 | 1/1986 |
| DE | 101 35 856 A1 | 2/2003 |
| FR | 2 749 817 | 12/1997 |
| FR | 2 780 689 | 1/2000 |
| GB | 2 183 988 A | 6/1987 |
| JP | 580000441 | 1/1983 |
| JP | 58033549 | 2/1983 |
| JP | 58149841 | 9/1983 |
| JP | 60199751 | 10/1985 |
| JP | 63110050 | 5/1988 |
| JP | 02095953 | 4/1990 |

OTHER PUBLICATIONS

European Search Report FR 0409598.

* cited by examiner

*Primary Examiner*—Rodney B. White
(74) *Attorney, Agent, or Firm*—Hogan & Hartson LLP

(57) ABSTRACT

An automobile vehicle seat includes a seat pan adjustable in height in relation to a support frame attached to the floor of the vehicle and an attachment point for a seat belt attached to the seat pan. A cable element is attached by one end to the support frame and the seat pan includes locking means adapted to allow the cable to slide during the voluntary variations in height of the seat pan in relation to the frame or, alternatively, to block the cable element by jamming during a high deceleration so as to prevent the seat pan from moving up in relation to the support frame.

8 Claims, 3 Drawing Sheets

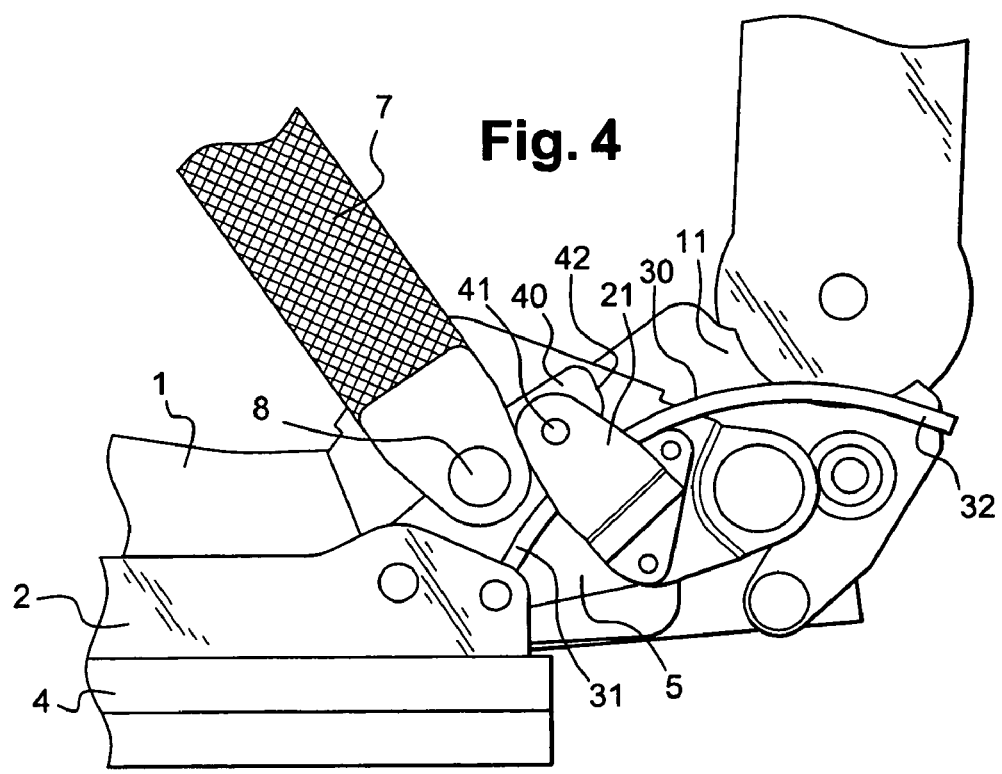
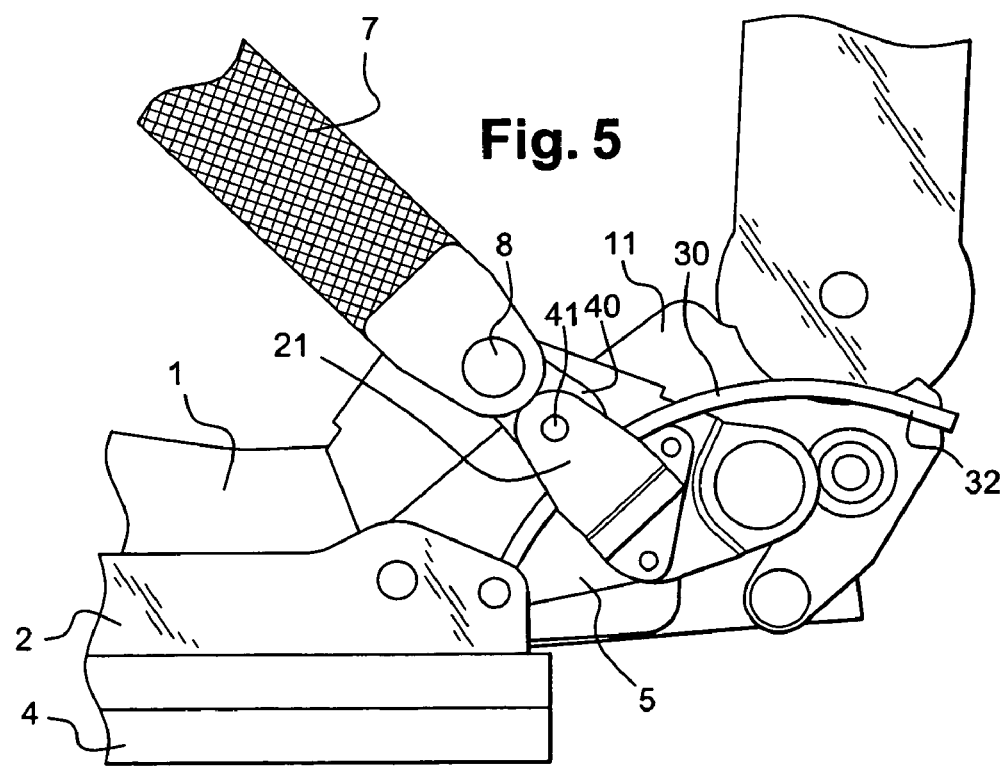

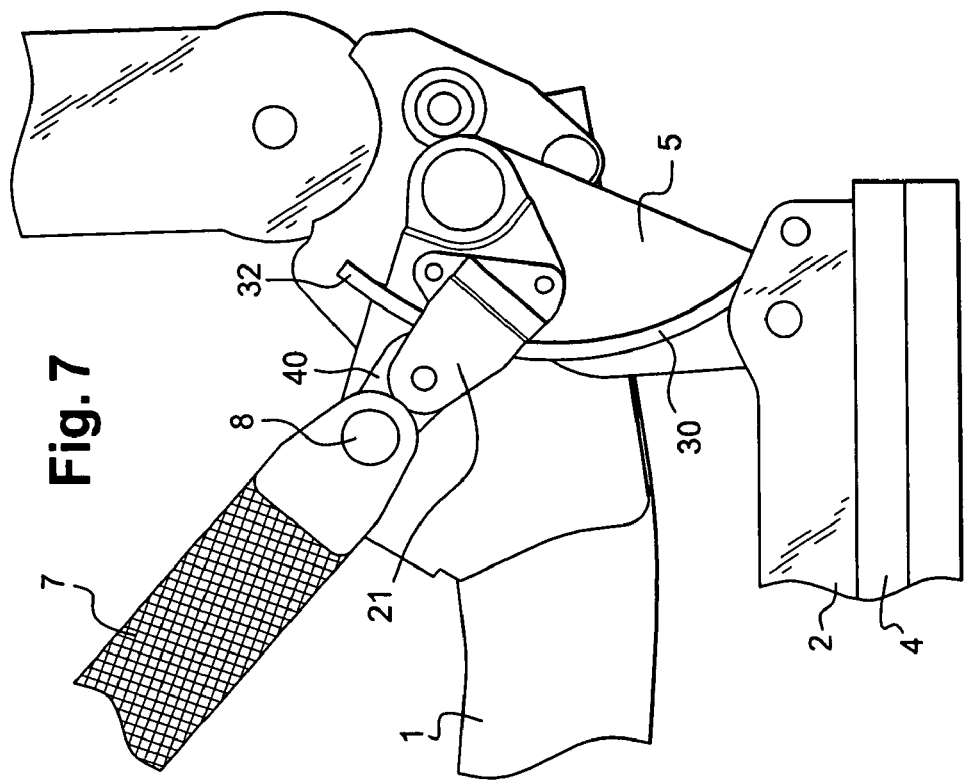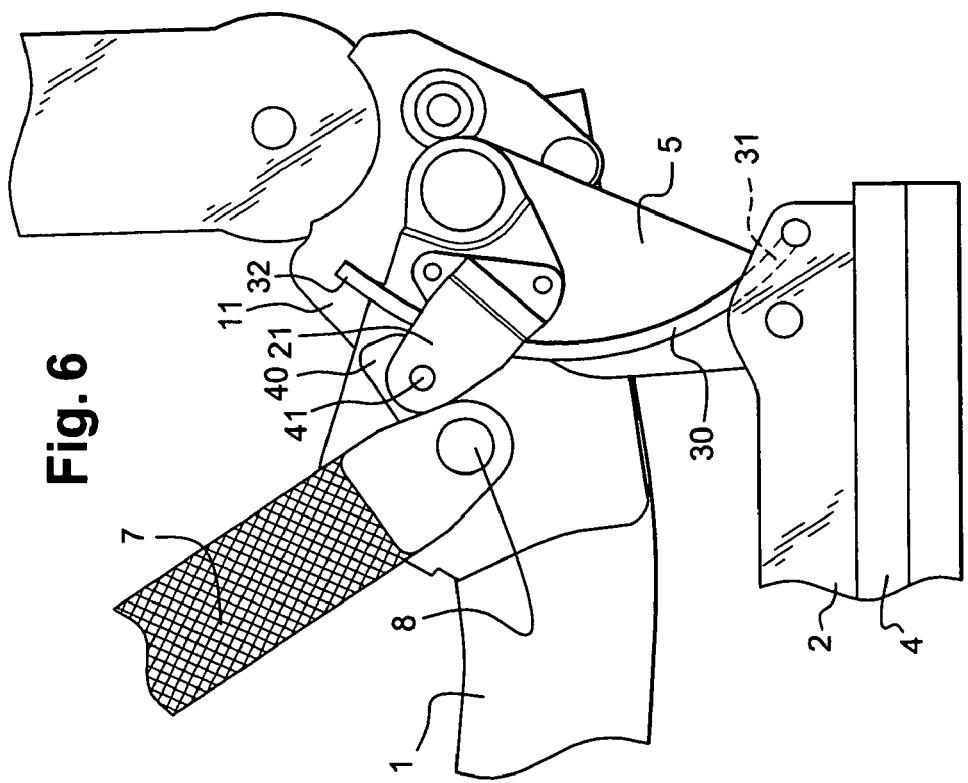

AUTOMOBILE SEAT WITH ADJUSTABLE-HEIGHT SEAT PAN HAVING A SEAT BELT ATTACHMENT POINT

RELATED APPLICATION

The present application claims priority of French Patent Application No. 0409598 filed Sep. 10, 2004, which is incorporated in its entirety herein by this reference.

1. Field of the Invention

The present invention relates to an automobile vehicle seat including a seat pan adjustable in height and a seat belt attachment point attached to the seat pan.

2. Background of the Invention

The type of seat is generally known as a height adjustable seat and, as shown on FIG. 1, includes means, called a height adjusting mechanism, allowing the height of seat pan 1 to be adjusted and, sometimes, also simultaneously the tilt of the seat pan in relation to the floor 3 of the vehicle. Also, generally, the longitudinal position in the vehicle of such a seat is adjustable by means of lockable slides 4, also well known. The height adjusting mechanism then includes links 5 connecting the seat pan 1 to a support frame 2 itself installed on the slides 4 so that it can slide towards the front or towards the rear and be locked in position. The links 5 form with the seat pan 1 and the support frame 2 a deformable quadrilateral type system, that is, the height adjustment of the seat pan is obtained by the pivoting of the said links, controlled either manually or by a motor. Typically, the pivoting control is done by a gear system or similar which acts on a toothed segment 6 of at least one of the links and the locking of the seat pan in the position desired by the user results from the blocking of the control element or from the irreversibility of the control system.

All the forces resulting from the weight of the seat and its user or other forces liable to be applied to the seat pan are therefore transmitted to the support frame and, from there, to the floor, by the said links and the means ensuring their locking in position.

In certain seat systems, the seat belts 7 are now often anchored, at least their lower attachment points but also, sometimes, the upper attachment points, directly to the seat. This is especially to ensure correct positioning of the seat belt irrespective of the adjustment position of the seat in the vehicle. In particular, at least the lower attachment point 8 located on seat belt lock side is in common practice located on the seat pan. The result is that not only the weight of the seat and its occupant transit via the height adjusting mechanism as indicated above but, also, in the event of a shock or sudden deceleration generating substantial forces on the seat belt, these forces are transmitted directly to the seat pan, as shown by arrow F, and also therefore to the height adjusting mechanism. This mechanism, and its locking means, are submitted therefore, in the event of an accident, to very high forces resulting from the forces exerted on the seat pan towards the front and upwards, liable to deform or at least cause the unlocking of the height adjusting mechanism. There is then a risk that the seat pan will move upwards which is classically accompanied by a movement forward due to the deformable quadrilateral system. However, it is easy to understand that such a movement in the case of a shock must be avoided to ensure the safety of the occupant.

To solve the problem above, automatic seat pan retention systems in the event of high tension on the seat belt have already been proposed, for example in document EP-A-265747, the aim being to solidly attach the seat pan to the support frame in the event of such a force. These systems have however the disadvantage of being notch systems which leave a certain clearance over the distance between two successive notches before ensuring the locking of the seat pan. Also, these systems use parts which are rigid and bulky due to the fact that they must be sized so that the system can operate in all possible seat pan adjustment positions.

The aim of another system, described in FR-A-2768379, is only to provide, under the effect of a high tensile force on the seat belt, the locking of the links and therefore the seat pan. Being integrated into the seat pan and without links with the support frame, it reduces the overall size and also the stresses on the link pivoting control mechanisms. However, all the forces, in the event of an accident, are still taken integrally by the links and their hinge points, which means that the links must be oversized to withstand these exceptional forces.

SUMMARY OF THE INVENTION

The object of the present invention is therefore to solve these problems and to propose a system reliably preventing a movement of the seat pan in relation to the support frame in the event of high tensile forces on the seat belt anchored to seat pan. An other object is avoiding the need to oversize the links of the height adjusting mechanism whilst at the same time limiting the overall size of the system.

With these targets in mind, the subject of the invention is an automobile vehicle seat including a seat pan adjustable in height in relation to a support frame attached to the floor of the vehicle and a seat belt attachment point attached to the seat pan, wherein the seat includes a cable element attached by one end to the support frame and the seat pan houses locking means which include (a) bearing surface which is fixed in relation to the seat pan and (b) a cam pivoting around an axis parallel to said bearing surface between a rest position and an active position reached in the event of an accident, the cam including a thrust surface and being shaped and positioned so that (i) in the rest position, the cable element slides freely between the thrust surface of the cam and the bearing surface to allow voluntary variations in the height of the seat pan in relation to the frame and so that, (ii) in the active position of the cam, during a high deceleration, in the event of a shock or an accident, the cable element will be gripped between said thrust and bearing surfaces.

Thus, thanks to the invention, in the event of a shock or accident causing a high deceleration of the vehicle, the cable is locked on the seat pan by jamming, the cable being pressed between the said thrust and bearing surfaces. As one end of the cable is also attached securely to the support frame attached to the floor of the vehicle, or even directly to the said floor, the cable ensures a strong attachment of the said seat pan to the frame, so preventing the seat pan moving upwards. The tensile forces of the seat belt are transmitted substantially directly to the frame via the cable element. The forces on the height adjusting mechanism and its own positional locking means are therefore reduced to a great extent and there is no need therefore to oversize these elements.

The use of a cam to lock the cable means that, in the event of a high deceleration, if the seat pan starts to move under the effect of the inertial forces, and on account of the friction between the said cam and the cable, the grip ensured by the cam increases by a buttress effect and the locking is more securely ensured.

Also, in normal service, when there are no high decelerations, the cable can slide freely in relation to the locking means to allow the height of the seat pan to be adjusted. Moreover, when the seat pan is in low position, the free end of the cable element necessarily protrudes above the locking means. Thanks to the flexibility of the cable, this free end can however easily be placed in the framework of the seat pan, without causing an additional increase in the overall size, as will be seen better later, and remain concealed under the cover of the seat pan to conserve as well as possible the aesthetics of the seat.

According to a preferred embodiment, the seat belt attachment point is located on the said locking means so as to block the cable element in relation to the seat pan when a force exerted by the seat belt on its attachment point exceeds a predetermined threshold.

Thus, in the event of a shock or an accident, the tensile force on the seat belt due to the inertia of the seat occupant directly causes the locking of the cable in relation to the seat pan. Not only are the seat belt tensile forces almost directly transmitted to the frame, via the cable, due to the fact that the seat belt anchoring point is attached to the cable locking means but, in addition, the intensity of the cable blocking force can increase with the force exerted on the seat belt.

Preferentially, the attachment point of the seat belt is located on the cam so that a tensile force on the seat belt exceeding the said predetermined threshold, in particular under the effect of the said inertial force, causes the cam to pivot in cable grip direction.

The use of a cam to which the seat belt is attached, presents the advantage that the higher the tensile force, the higher the grip of the cable and therefore the locking strength achieved, this effect being combined with the buttress effect of the cam due to the friction between the cam and the cable.

According to an additional embodiment, the seat includes mechanical stop means arranged so as to prevent the pivoting of the cam when the force exerted by the seat belt is lower than the said predetermined threshold. Below this threshold, for example if the tensile force on the seat belt is lower than 1,000 N, the cam does not pivot and leaves therefore the cable free to slide. When the tensile force on the seat belt reaches and exceeds this threshold, the cam overrides these stop means and pivots so as to grip the cable.

According to a particular embodiment, the bearing surface is located at the bottom of a U-shaped fork or clevis attached to the seat pan and the cam is installed so as to pivot between the lugs of the fork. The cable is thus perfectly guided in normal service during the movements of the seat pan to ensure its height and/or tilt adjustment.

According to additional arrangements, the stop means are located on the lugs of the fork and designed so as to break when the force reaches the said threshold. Also, the stop means may be located on an inner face of the lugs of the fork and designed so that the lugs of the fork move apart when the force reaches the said threshold. The cable could also be attached to a frame attached directly to the floor, or even itself be attached directly to the floor, if the seat includes no slides, or to participate in the tearing strength of the slides if applicable.

Other features and advantages will become apparent on reading the following description of an automobile vehicle seat in accordance with the invention.

BRIEF DESCRIPTION OF THE DRAWINGS

The description refers to the accompanying drawings, on which:

FIG. 4 shows the system in the normal utilisation position of the seat, when the seat pan is in low position, FIG. 5 shows the system in the seat pan locking position, subsequent to an accident for example, when the seat pan is in low position, FIG. 6 shows the system in the normal utilisation position of the seat, when the seat pan is in high position, and FIG. 7 shows the system in the seat pan locking position, when the seat pan is in high position.

DETAILED DESCRIPTION

Figure 1:
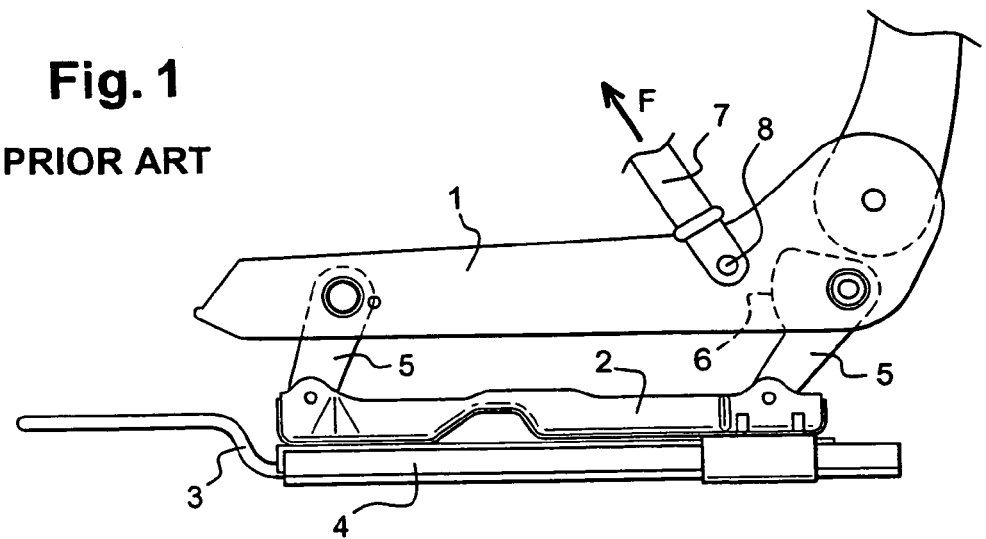
FIG. 1 is a view showing in a simplified manner the attachment of a seat adjustable in height to the floor of a vehicle, in accordance with prior art, already described in the introduction of this paper.

The present invention is an automobile seat which includes a seat pan adjustable in height in relation to a support frame attached to the floor of the vehicle and a seat belt attachment point attached to the seat pan. The seat includes a cable element attached by one end to the support frame and the seat pan houses locking means which include (a) bearing surface which is fixed in relation to the seat pan and (b) a cam pivoting around an axis parallel to said bearing surface between a rest position and an active position reached in the event of an accident, the cam including a thrust surface and being shaped and positioned so that (i) in the rest position, the cable element slides freely between the thrust surface of the cam and the bearing surface to allow voluntary variations in the height of the seat pan in relation to the frame and so that, (ii) in the active position of the cam, during a high deceleration, in the event of a shock or an accident, the cable element will be gripped between said thrust and bearing surfaces.

In the event of a shock or accident causing a high deceleration of the vehicle, the cable of the present invention is locked on the seat pan by jamming, the cable being pressed between the said thrust and bearing surfaces. As one end of the cable is also attached securely to the support frame attached to the floor of the vehicle, or even directly to the said floor, the cable ensures a strong attachment of the said seat pan to the frame, so preventing the seat pan moving upwards. The tensile forces of the seat belt are transmitted substantially directly to the frame via the cable element. The forces on the height adjusting mechanism and its own positional locking means are therefore reduced to a great extent and there is no need therefore to oversize these elements.

The use of a cam to lock the cable means that, in the event of a high deceleration, if the seat pan starts to move under the effect of the inertial forces, and on account of the friction between the said cam and the cable, the grip ensured by the cam increases by a buttress effect and the locking is more securely ensured.

Also, in normal service, when there are no high decelerations, the cable can slide freely in relation to the locking means to allow the height of the seat pan to be adjusted. Moreover, when the seat pan is in low position, the free end of the cable element necessarily protrudes above the locking means. Thanks to the flexibility of the cable, this free end can however easily be placed in the framework of the seat pan, without causing an additional increase in the overall size, as will be seen better later, and remain concealed under the cover of the seat pan to conserve as well as possible the aesthetics of the seat.

According to a preferred embodiment, the seat belt attachment point is located on the said locking means so as to block the cable element in relation to the seat pan when a force exerted by the seat belt on its attachment point exceeds a predetermined threshold.

Thus, in the event of a shock or an accident, the tensile force on the seat belt due to the inertia of the seat occupant directly causes the locking of the cable in relation to the seat pan. Not only are the seat belt tensile forces almost directly transmitted to the frame, via the cable, due to the fact that the seat belt anchoring point is attached to the cable locking means but, in addition, the intensity of the cable blocking force can increase with the force exerted on the seat belt.

Preferentially, the attachment point of the seat belt is located on the cam so that a tensile force on the seat belt exceeding the said predetermined threshold, in particular under the effect of the said inertial force, causes the cam to pivot in cable grip direction.

The use of a cam to which the seat belt is attached, presents the advantage that the higher the tensile force, the higher the grip of the cable and therefore the locking strength achieved, this effect being combined with the buttress effect of the cam due to the friction between the cam and the cable.

According to an additional embodiment, the seat includes mechanical stop means arranged so as to prevent the pivoting of the cam when the force exerted by the seat belt is lower than the said predetermined threshold. Below this threshold, for example if the tensile force on the seat belt is lower than 1,000 N, the cam does not pivot and leaves therefore the cable free to slide. When the tensile force on the seat belt reaches and exceeds this threshold, the cam overrides these stop means and pivots so as to grip the cable.

According to a particular embodiment, the bearing surface is located at the bottom of a U-shaped fork or clevis attached to the seat pan and the cam is installed so as to pivot between the lugs of the fork. The cable is thus perfectly guided in normal service during the movements of the seat pan to ensure its height and/or tilt adjustment.

According to additional arrangements, the stop means are located on the lugs of the fork and designed so as to break when the force reaches the said threshold. Also, the stop means may be located on an inner face of the lugs of the fork and designed so that the lugs of the fork move apart when the force reaches the said threshold. The cable could also be attached to a frame attached directly to the floor, or even itself be attached directly to the floor, if the seat includes no slides, or to participate in the tearing strength of the slides if applicable.

More particularly, and in accordance with the invention, a metallic cable element 30 with, for example, a diameter of around 8 mm and which can be bare or coated, for example plastified, is attached by one end to the support frame 2 attached to slides 4 holding the seat on the floor of the vehicle and extends upwards, beside the seat pan framework 1.

Also, the seat pan 1 of the seat includes, attached to a seat pan framework flange 11, locking means 20 comprising, in the example shown, a fork 21 and a pivoting cam 40.

The fork 21 has two lugs 22, 23 delimiting between them and with a bearing surface 24 at the bottom of the fork, a space 25 with suitable dimensions allowing the cable 30 to slide freely. The fork 21 is attached to the seat pan framework 11, for example by screwing, near to the anchoring point of the seat belt 7.

Figure 3:
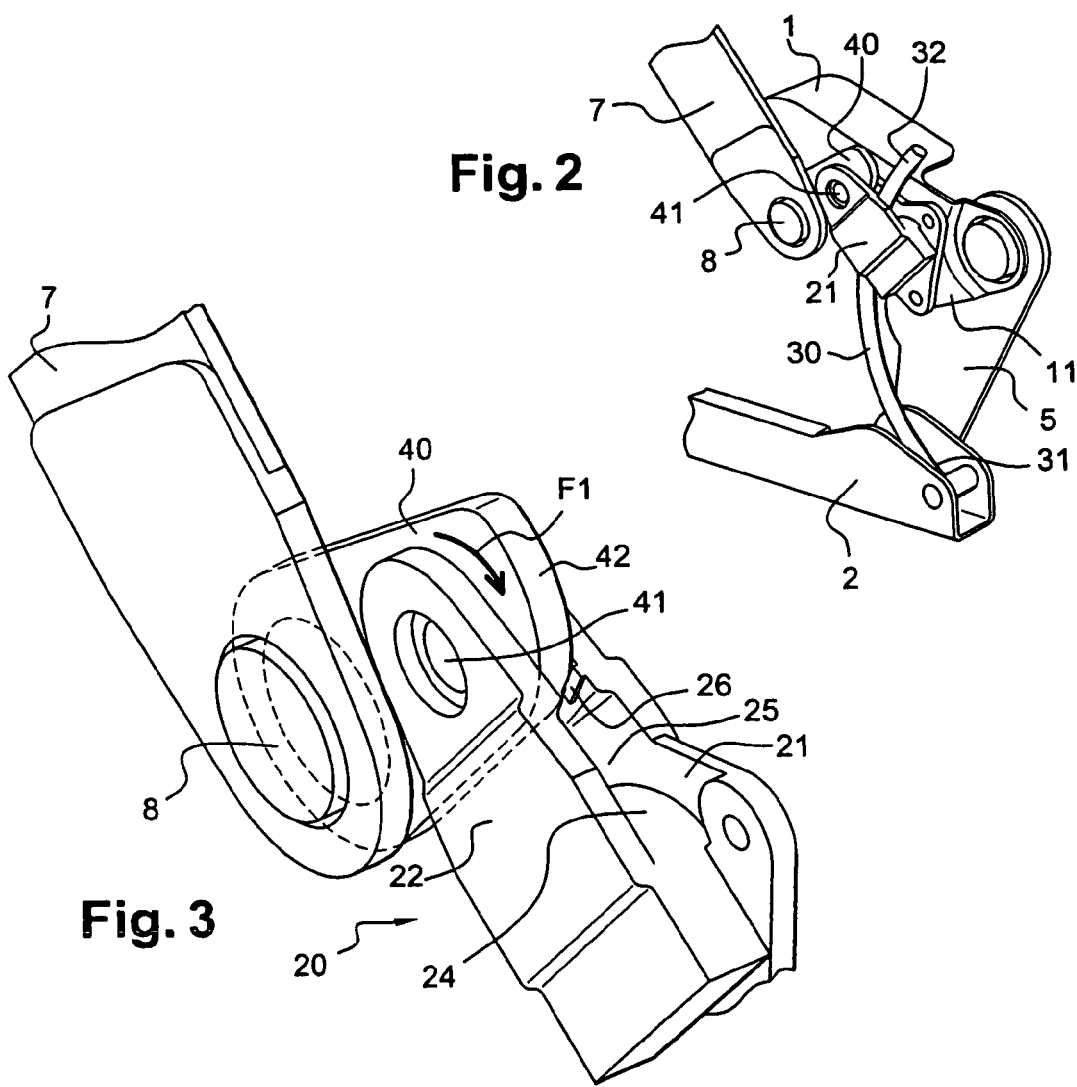
FIG. 3 is an enlarged scale detailed view of the locking system alone, without the cable.

The pivoting cam 40 is installed hinged on a shaft 41 passing through the lugs of the fork 21, perpendicular to these lugs and parallel to the bearing surface 24. The cam 40 comprises a lever which has, at a first end, a thrust surface 42 shaped in the form of a cam, adapted so that it can hold the cable 30 against the bearing surface 24 when the cam pivots to a locking position. The opposite end of the cam 40 includes the anchoring point 8 of the seat belt 7. Stops 26 prevent the cam from pivoting in normal seat utilisation situation. These stops are formed, for example, from the inner face of one of the lugs or the two lugs 22, 23 of the fork 21 as can be seen on FIG. 3. The shape of the stops 26 is determined, in relation with that of the lugs, and in accordance with the materials used, so that said stops 26 form a real stop preventing the pivoting of the fork whilst the torque exerted on the cam remains lower than the predetermined threshold and, when this torque reaches and exceeds this threshold, the stops are sheared or deformed and/or the lugs of the fork deform to allow the cam to pivot in the direction shown by arrow F1 and the bearing of its thrust surface 42 against the cable 30 and, consequently, the grip of the cable against the bearing surface 24 of the fork.

The cable element 30 can be preshaped, for example curved as shown on the figures, but is designed especially to conserve sufficient flexibility so as to deform by bending, as that happens when the height of the seat pan is varied, whilst retaining sufficient stiffness so that the cable can then slide easily in the fork 21 without the risk of jamming. Also, it must remain sufficiently flexible so that it can be applied against the bearing surface 24 at the bottom of the fork in locking position.

Figure 2:
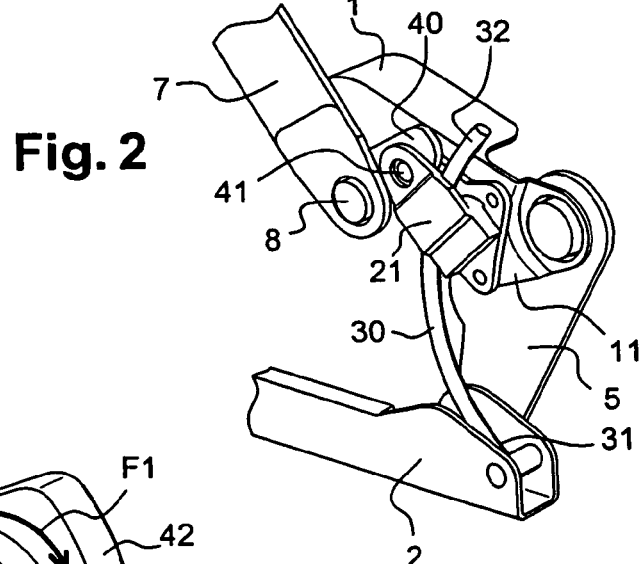
FIG. 2 is a detailed perspective view of the cable and locking system according to the invention, in the normal utilisation position of the seat.

For normal use of the seat, when there are no strong forces on the seat belt 7, the system is in the position shown on FIGS. 2, 4 and 6. The cable 30 is, in this case, free to slide in the space 25 of the fork and the cam 40 is held in contact against the stops 26. The seat height adjusting mechanism can then operate normally to pass, for example, from a low position shown on FIG. 4 to a high position shown on FIG. 6. During these changes in the height of the seat pan, the cable slides freely in the fork, its free end 32 protruding more or less above the fork and can be held, and possibly guided, against the seat pan framework flange 11, under the furnishing of the seat and therefore without being visible.

In the event of an accident, when the tensile force exerted on the seat belt reaches for example 1,000 N, this force creates on the cam a torque which exceeds the predetermined torque beyond which the cam shears or deforms the stops 26. The cam 40 then pivots until it grips the cable in the bottom of the fork 21, as shown on FIGS. 5 and 7. The tensile force exerted on the seat belt is then retransmitted directly to the support frame 2 by the cable 30. It is also to be noted that, on account of the shape of the cam and the relative arrangement of the hinge axes and of the seat belt attachment point on the cam, the grip force of the cam on the cable can increase as the tension of the seat belt increases. Also, the shape of the cam and the friction coefficient with the cable make the system self-locking: the more the cable tends to be drawn by the tensile force that it takes, the more it tends to drive the cam and therefore increase the locking force.

Means other than tensile force can be foreseen on the seat belt to cause the triggering of the locking of the cable. For example, locking could be controlled by actuators reacting, for example, to a deceleration threshold, for example pyrotechnic actuators. The self-locking effect will be conserved however by the use of the cam system to grip the cable. To favour this effect, the cable and the thrust surface of the cam could be advantageously treated or coated with a material favouring friction.

What is claimed is:

1. Automobile vehicle seat comprising:
   a support frame adapted to be operatively attached to the floor of the vehicle,
   a seat pan adjustable in height in relation to the support frame
   an attachment point for a seat belt attached to the seat pan,
   a cable attached by one end to the support frame, and
   locking means associated with the seat pan and including
      a bearing surface fixed in relation to the seat pan and a cam pivoting around an axis parallel to the said bearing surface between a rest position during normal use and an active position reached in the event of an accident, the cam including a thrust surface and being shaped and positioned so that, in the rest position, the cable slides freely between the thrust surface of the cam and the bearing surface to allow voluntary variations in the height of the seat pan in relation to the frame and that, in the active position of the cam, the cable is gripped between said thrust and bearing surfaces.

2. Automobile vehicle seat comprising:
   a support frame adapted to be operatively attached to the floor of the vehicle,
   a seat pan adjustable in height in relation to the support frame,
   an attachment point for a seat belt attached to the seat pan,
   a cable attached by one end to the support frame, and
   locking means associated with the seat pan and including
      a bearing surface fixed in relation to the seat pan and a cam pivoting around an axis parallel to the said bearing surface between a rest position during normal use and an active position reached in the event of an accident, the cam including a thrust surface and being shaped and positioned so that, in the rest position, the cable slides freely between the thrust surface of the cam and the bearing surface to allow voluntary variations in the height of the seat pan in relation to the frame and that, in the active position of the cam, the cable is gripped between said thrust and bearing surfaces, wherein the attachment point of the seat belt is located on the said locking means so as to block the cable element in relation to the seat pan when the force exerted by the seat belt on its attachment point exceeds a predetermined threshold.

3. Seat according to claim 2, wherein the attachment point of the belt is located on the cam so that a tensile force on the seat belt, exceeding the said predetermined threshold, causes the cam to pivot in a cable grip direction.

4. Seat according to claim 3, wherein the seat includes mechanical stop means arranged so as to prevent the pivoting of the cam whilst the force exerted by the seat belt is lower than the said predetermined threshold.

5. Automobile vehicle seat comprising:
   a support frame adapted to be operatively attached to the floor of the vehicle,
   a seat pan adjustable in height in relation to the support frame,
   an attachment point for a seat belt attached to the seat pan,
   a cable attached by one end to the support frame, and
   locking means associated with the seat pan and including
      a bearing surface fixed in relation to the seat pan and a cam pivoting around an axis parallel to the said bearing surface between a rest position during normal use and an active position reached in the event of an accident and an active position reached in the event of an accident, the cam including a thrust surface and being shaped and positioned so that, in the rest position, the cable slides freely between the thrust surface of the cam and the bearing surface to allow voluntary variations in the height of the seat pan in relation to the frame and that, in the active position of the cam, the cable is gripped between said thrust and bearing surfaces, wherein the bearing surface is located at the bottom of a U-shaped fork attached to the seat pan, the cam being installed so as to pivot between the lugs of the fork.

6. Seat according to claim 5, wherein the stop means are located on at least one of the lugs of the fork and designed so as to break when the force reaches the said threshold.

7. Seat according to claim 5, wherein the stop means are located on an inner face of the lugs of the fork and designed so that the lugs of the fork move apart when the force reaches the said threshold.

8. Seat according to any one of the claims 1 to 7, wherein the cable and/or the thrust surface of the cam have a coating favouring friction.

* * * * *